US012235765B2

(12) United States Patent
Szapiro et al.

(10) Patent No.: US 12,235,765 B2
(45) Date of Patent: Feb. 25, 2025

(54) CACHE LOCALITY WHEN USING REPURPOSED CACHE MEMORY

(71) Applicant: NVIDIA CORPORATION, Santa Clara, CA (US)

(72) Inventors: Ariel Szapiro, Tel Aviv (IL); Anurag Chaudhary, San Jose, CA (US); Mark Rosenbluth, Uxbridge, MA (US); Mayank Baunthiyal, Portland, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 127 days.

(21) Appl. No.: 18/322,486

(22) Filed: May 23, 2023

(65) Prior Publication Data
US 2024/0394186 A1 Nov. 28, 2024

(51) Int. Cl.
*G06F 12/0813* (2016.01)
*G06F 12/0811* (2016.01)
*G06F 12/0891* (2016.01)

(52) U.S. Cl.
CPC ...... *G06F 12/0813* (2013.01); *G06F 12/0811* (2013.01); *G06F 12/0891* (2013.01)

(58) Field of Classification Search
CPC ........... G06F 12/01813; G06F 12/0811; G06F 12/0891
See application file for complete search history.

(56) References Cited

U.S. PATENT DOCUMENTS

| 7,421,568 B2 * | 9/2008 | Stempel | G06F 9/30152 |
| | | | 712/E9.055 |
| 2024/0104013 A1 * | 3/2024 | LeMay | G06F 12/14 |

OTHER PUBLICATIONS

An article titled "Did IBM Just Preview The Future of Caches?" by Dr. Ian Cutress published Sep. 2, 2021. (Year: 2021).*

* cited by examiner

*Primary Examiner* — Michael Krofcheck
*Assistant Examiner* — Janice M. Girouard
(74) *Attorney, Agent, or Firm* — Squire Patton Boggs LLP; Sarah Mirza

(57) ABSTRACT

Various embodiments include techniques for storing data in a repurposed cache memory in a computing system. The disclosed techniques include a system level cache controller that processes a memory operation for a processing unit. The controller and the processing unit communicate over a network-on-chip. To process the memory operation, the controller selects a repurposed cache memory from a pool of active cache memories associated with processing units that are inoperable and/or are in a low-power state. To select the repurposed cache memory, the controller generates a candidate vector that identifies the position of the requesting processing unit relative to the controller. The candidate vector enables the controller in selecting a repurposed cache memory that is, for example, on the shortest path between the processing unit and the controller. These techniques result in a lower latency, and improved memory performance, relative to prior conventional techniques.

20 Claims, 7 Drawing Sheets

CACHE LOCALITY WHEN USING REPURPOSED CACHE MEMORY

FIELD OF THE VARIOUS EMBODIMENTS

Various embodiments relate generally to computing system architectures and, more specifically, to improving cache locality when using repurposed cache memory.

DESCRIPTION OF THE RELATED ART

A computing system generally includes, among other things, one or more processing units, such as central processing units (CPUs) and/or graphics processing units (GPUs), network adapters, and one or more memory systems. Processing units execute user mode software applications, which submit and launch compute tasks, executing on one or more compute engines included in the processing units. In operation, processing units load data from the one or more memory systems, perform various arithmetic and logical operations on the data, and store data back to the one or more memory systems.

Processing units typically access data via a hierarchical memory system, including one or more relatively small, high performance cache memory systems and a relatively large, low performance main memory system. In one example, each processing unit may have a small, high-performance level 1 cache memory that stores the data that is most likely to be requested by the processing unit in the immediate future. Each processing unit may further have a somewhat larger, somewhat lower performance level 2 cache memory that stores the data that is likely to be requested by the processing unit in the near future, but not as immediately as the data in the level 1 cache memory. The system may include a system level cache memory that services multiple processing units. The system level cache memory is typically larger and lower performance than the level 2 cache memories. Finally, the system may include a main memory system that is larger and lower in performance than the system level cache memory. When a processing unit requests data from memory, to read data from memory and/or to write data to memory, one or more memory controllers, referred to collectively as "the memory controller," first seeks the data from the level 1 cache memory. If the data is not stored in the level 1 cache memory, then the memory controller next seeks the data from the level 2 cache memory. If the data is not stored in the level 1 cache memory or in the level 2 cache memory, then a system level cache controller seeks the data from the system level cache memory followed by main memory, with decreasing performance at each step in the hierarchical memory system. In some examples, the system level cache memory can function as a level 3 cache memory.

In order to increase performance of such a hierarchical memory system, the memory controller can recycle or repurpose the level 2 cache memory associated with a processing unit that is not currently using the local level 2 cache memory. This situation can occur when a processing unit fails or when a processing unit is in an inactive, low-power state because the processing unit is not currently executing any application programs. A processing unit can fail for various reasons, including a manufacturing defect, a malfunctioning component, an overtemperature condition, operation over an extended period of time, and/or the like. In such cases, the memory controller can recycle or repurpose the level 2 cache memory of a failed or inactive processing unit to store data for other active processing units. In some examples, the repurposed level 2 cache memory can function as a level 4 cache memory. When the memory controller retrieves data from the main memory system, the system level cache memory can store the data in a recycled level 2 cache memory, also referred to herein as a repurposed level 2 cache memory. The memory controller can store data retrieved from the main memory system into the repurposed level 2 cache memories in a balanced fashion. In this manner, data is stored in the repurposed level 2 cache memories uniformly among the repurposed level 2 cache memories, such that this data is readily retrievable by the memory controller. When a processing unit requests data that is not currently stored in the local level 1 cache memory or local level 2 cache memory, and the data is also not stored in the system level cache memory, the memory controller can look for the data in one or more repurposed level 2 cache memories before retrieving the data from the main memory system. If the memory controller does not find the data in any repurposed level 2 cache memory, then the memory controller retrieves the data from the main memory system.

One problem with this technique for storing data in repurposed level 2 cache memories is that, although data stored in a repurposed level 2 cache memory may be readily retrievable by the memory controller, the data stored in the repurposed level 2 cache memory may be far away from the processing unit that requested the data. As a result, the performance when a processor requests data that is stored in a repurposed level 2 cache memory can be significantly less than when a processor requests data that is stored in a local level 1 cache memory or level 2 cache memory or in the system level cache memory.

As the foregoing illustrates, what is needed in the art are more effective techniques for storing data in repurposed cache memories in a computing system.

SUMMARY

Various embodiments of the present disclosure set forth a computer-implemented method for storing data in a repurposed cache memory in a computing system. The method includes determining that a memory operation from a first processing unit results in a miss in a system level cache memory. The method further includes retrieving data associated with the memory operation from a system memory. The method further includes generating a candidate vector that specifies a direction from the system level cache memory to the first processing unit. The method further includes electing a repurposed level two cache memory based on the candidate vector. The method further includes storing the data in a cache line of the repurposed level two cache memory.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, when possible, data is stored in repurposed level 2 cache memories so as to be readily retrievable by both the memory controller and by the requesting processing unit. As a result, a processing unit that requests data stored in a repurposed level 2 cache memory realizes lower data access times relative to prior conventional approaches. These lower data access times can lead to higher computational performance and reduced power consumption. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
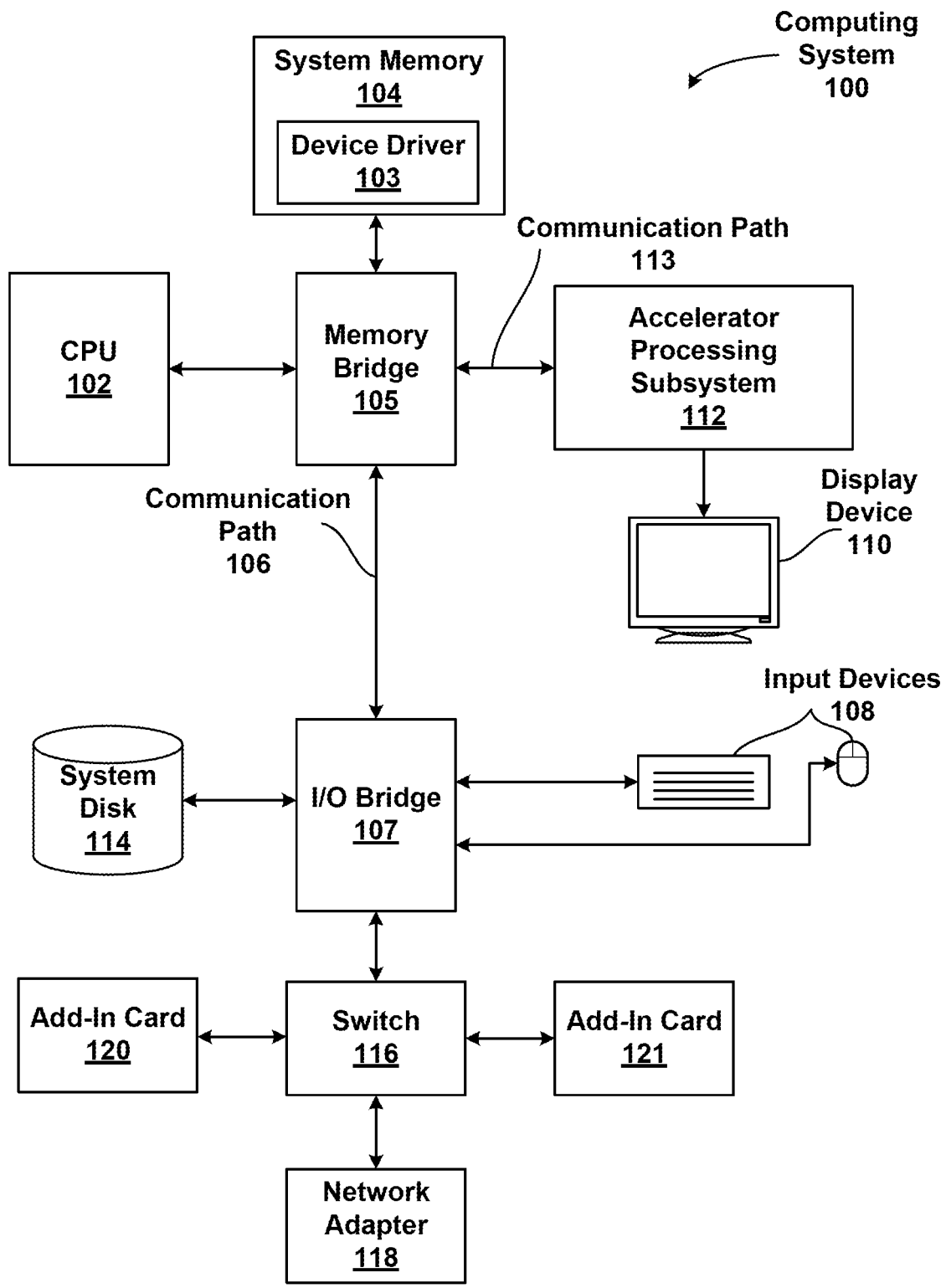
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. Such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Further, in certain embodiments, one or more components shown in FIG. 1 may not be present. For example, switch 116 could be eliminated, and network adapter 118 and add-in cards 120, 121 would connect directly to I/O bridge 107.

Storing Data in Repurposed Cache Memories in a Computing System

Various embodiments include techniques for storing data in a repurposed cache memory in a computing system. The disclosed techniques provide for reduced latency for memory access operations directed to data stored in a repurposed level 2 cache memory. Processing units and repurposed level 2 cache memories are distributed in a network topology, such as a two-dimensional (2D) mesh topology. When a system level cache controller stores data in a cache line of a repurposed level 2 cache line, the system level cache controller also stores state data for each cache line. The state data can be a two-bit state that indicates whether the requesting processing unit is above, below, left, or right of the system level cache memory associated with the system level cache controller. Alternatively, the state data can be a three-bit state to indicate one of eight directions toward the requesting processing unit. Alternatively, the state data can be a multibit state that indicates a group of processing units, such as four, eight, or sixteen processing units, that includes the requesting processing unit. Each of the groups of processing units has a different identifier that is stored in the direction state. Alternatively, the state data can be a multibit state that identifies the particular requesting processing unit. Each of the processing units has a different unique identifier that is stored in the direction state. This state data aids the system level cache controller when subsequently allocating a repurposed level 2 cache memory that is on a path between the system level cache memory and the original requesting processing unit.

Figure 2:
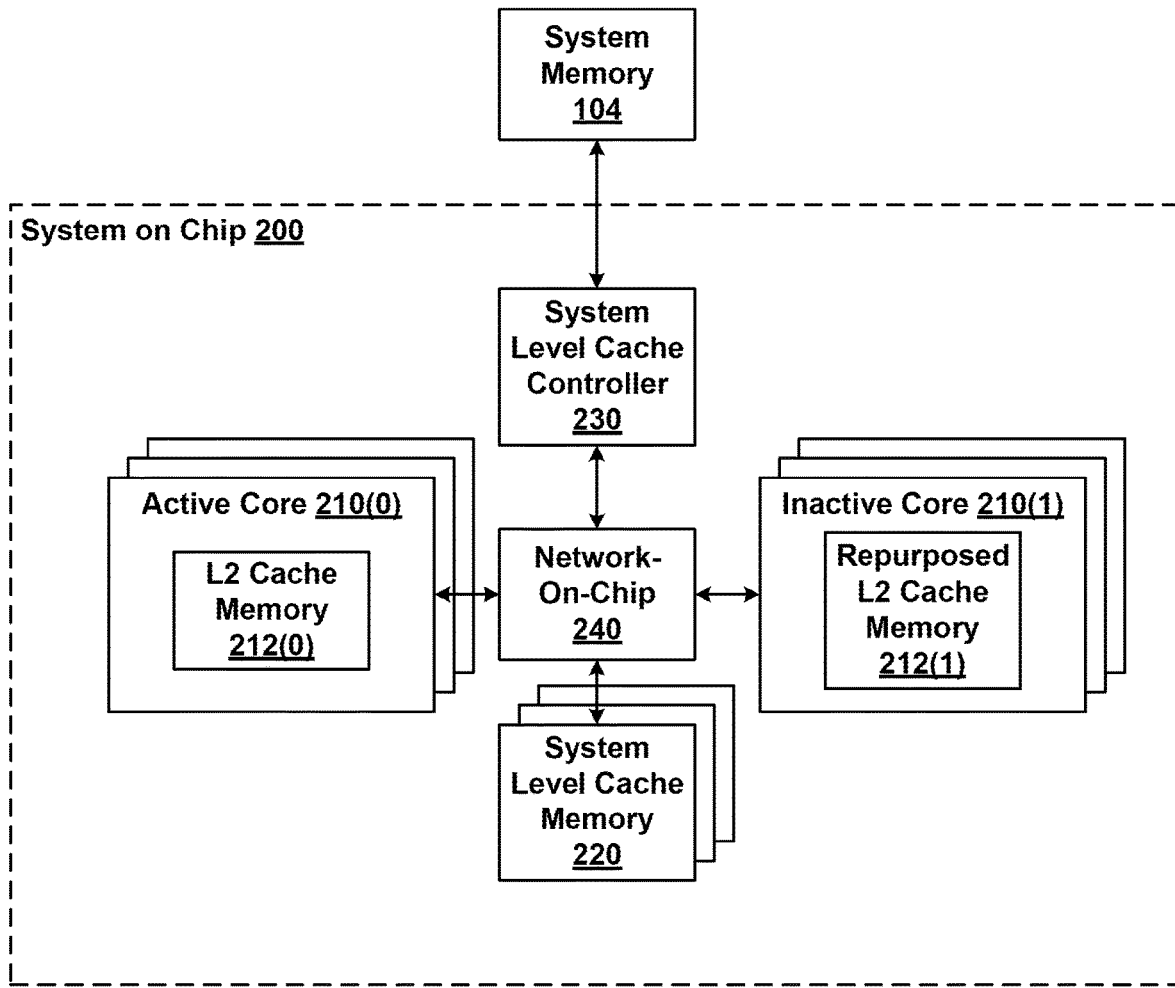
FIG. 2 is a block diagram of a system on chip and system memory based on the computing system of FIG. 1, according to various embodiments, according to various embodiments.

FIG. 2 is a block diagram of a system on chip 200 and system memory 104 based on the computing system 100 of FIG. 1, according to various embodiments. As shown, the system on chip 200 includes, without limitation, one or more active cores, such as active core 210(0), one or more inactive cores, such as inactive core 210(1), one or more system level cache memories, such as system level cache memory 220, and a system level cache controller 230, all connected via a network-on-chip 240.

As shown, active core 210(0) includes a level 2 (L2) cache memory 212(0). Active core 210(0) includes processing units, such as one or more CPUs 102, one or more accelerator processing subsystems 112, and/or the like. Additionally, active core 210(0) includes other components, such as a memory bridge 105, an I/O bridge 107, a network adapter 118, a level 1 cache memory (not shown), a local memory controller (not shown), and/or the like.

When a processing unit included in active core 210(0) requests data from memory, such as to read data from memory and/or to write data to memory, the local memory controller, first seeks the data from level 1 cache memory. If the data is not stored in level 1 cache memory, then the local memory controller next seeks the data from level 2 cache memory 212(0). If the data is also not stored in level 2 cache memory 212(0), then the active core 210(0) communicates with the system level cache controller 230 via network-on-chip 240 to retrieve data from a memory external to active core 210(0).

As shown, inactive core 210(1) includes a repurposed level 2 (L2) cache memory 212(1). Inactive core 210(1) includes processing units, such as one or more CPUs 102, one or more accelerator processing subsystems 112, and/or the like. Additionally, inactive core 210(1) includes other components, such as a memory bridge 105, an I/O bridge 107, a network adapter 118, a level 1 cache memory (not shown), a local memory controller (not shown), and/or the like. In some examples, inactive core 210(1) is inactive because one or more components of inactive core 210(1) is damaged, has failed, or is otherwise rendered inoperable. Inactive core 210(1) could be rendered inoperable due to a flaw at the time of manufacture, due to damage during operation, and/or the like. Additionally or alternatively, inactive core 210(1) could be in a state where the processing unit is not currently accessing repurposed level 2 cache memory 212(1). Inactive core 210(1) can be in such a state because the processing unit is not executing any application programs, because the system on chip 200 is in a low-power state to reduce power consumption, because of a system policy or configuration, and/or the like. Although inactive core 210(1) is rendered inoperable and/or in a low-power state, repurposed level 2 cache memory 212(1) can be powered up and operable. In some examples, inactive core 210(1) may not be present. In such cases, repurposed level 2 cache memory 212(1) is replaced by a level 2 cache memory 212 that acts as a standalone memory. Such a level 2 cache memory 212 can operate as a cache memory without a corresponding core 210(1). Therefore, a standalone level 2 cache memory 212 is generally available to the system level cache controller 230 without being dependent on the state of any core 210. Additionally or alternatively, inactive core 210(1) could be in a low-power state because the processing unit is not currently executing any application programs, because the system on chip 200 is reducing power consumption, because of a system policy or configuration, and/or the like.

System level cache controller 230 manages the storage of data to and retrieval of data from system level cache memory 220, repurposed level 2 (L2) cache memory 212(1), and/or system memory 104. System level cache controller 230 assists a processing unit included in active core 210(0) that requests data from memory, where the data is not stored in level 1 cache memory or in level 2 cache memory 212(0). System level cache controller 230 can determine whether the requested data is stored in the system level cache memory 220. In this manner, the system level cache memory 220 effectively serves as a level 3 cache memory. If the requested data is stored in the system level cache memory 220, then system level cache controller 230 retrieves the data from system level cache memory 220. System level cache controller 230 transmits the requested data to the requesting processing unit included in active core 210(0). If the requested data is not stored in the system level cache memory 220, then system level cache controller 230 can determine whether the requested data is stored on a repurposed level 2 cache memory, such as repurposed level 2 cache memory 212(1). In some examples, system level cache controller 230 can determine whether the requested data is stored on a repurposed level 2 cache memory by performing one or more snoop operations. More generally, system level cache controller 230 can determine whether the requested data is stored on a repurposed level 2 cache memory by performing one or more access operations.

If the requested data is stored in repurposed level 2 cache memory 212(1), then repurposed level 2 cache memory 212(1) directly transmits the requested data to the requesting processing unit included in active core 210(0). In some examples, a requesting unit other than a processing unit, such as an input/output (I/O) device, can request data. In such examples, if the requested data is stored in repurposed level 2 cache memory 212(1), then repurposed level 2 cache memory 212(1) directly transmits the requested data to the requesting unit. If the requested data is not stored in repurposed level 2 cache memory 212(1), then system level cache controller 230 can retrieve the requested data from system memory 104. In this manner, the repurposed level 2 cache memory 212(1) effectively serves as a level 4 cache memory.

Figure 3:
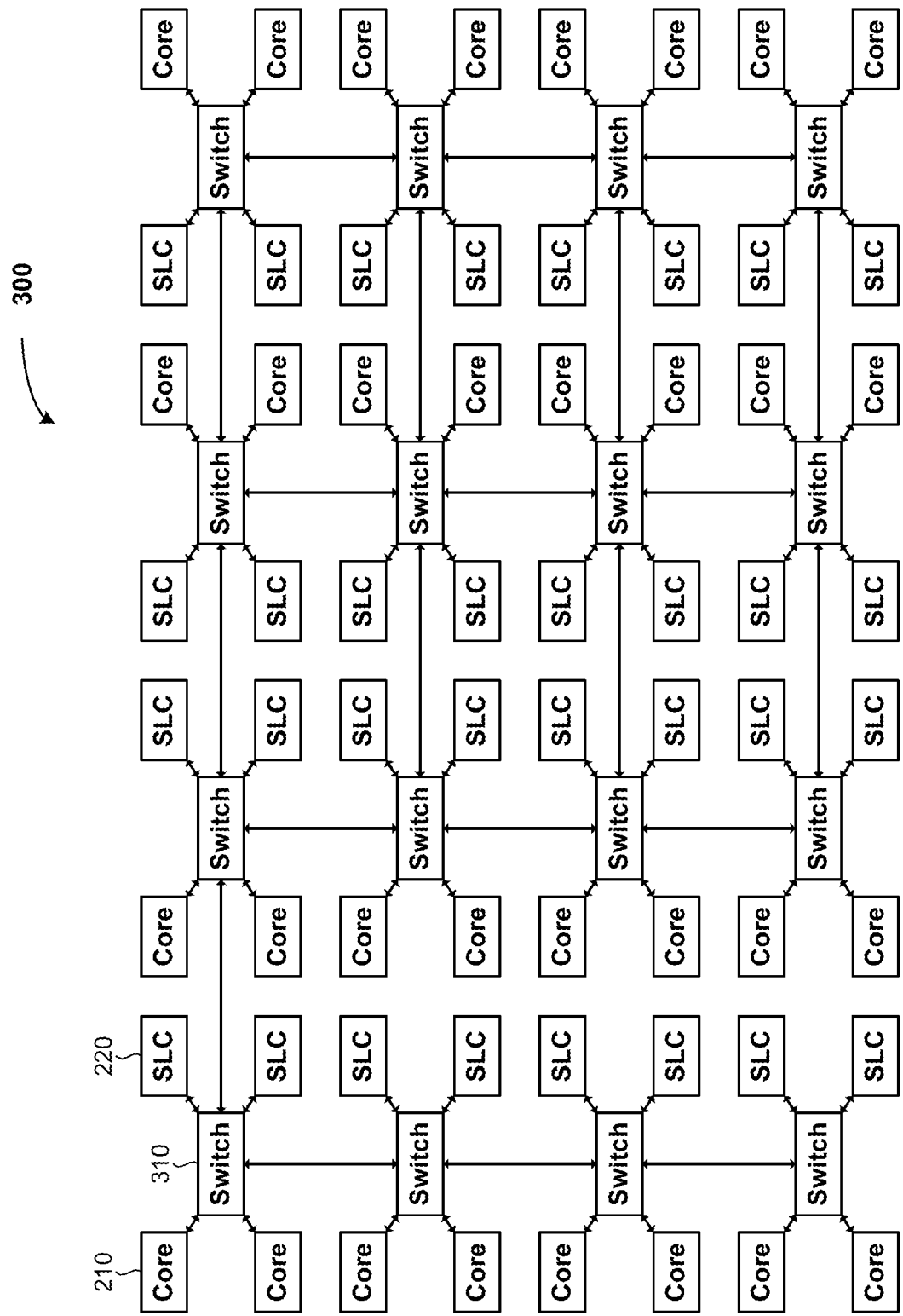
FIG. 3 is a block diagram of a network of the cores and system level cache memories of FIG. 2, according to various embodiments.

FIG. 3 is a block diagram of a network 300 of the cores 210 and system level cache memories (SLCs) 220 of FIG. 2, according to various embodiments. As shown, the network topology of FIG. 3 is a 2D mesh network 300. The cores 210 and system level cache memories (SLCs) 220 communicate over the network 300 via switches 310. Together, the switches 310 constitute the switching fabric of the 2D mesh network 300 through which data flows between active cores 210, inactive cores 210 with repurposed level 2 cache memories 212(1), system level cache memories 220, and system memory 104 (not shown in FIG. 3).

Cores 210 are distributed throughout the 2D mesh network 300. A first portion of the cores are active cores 210 with active level 2 cache memories 212. Over time, each active core 210 issues memory operations to the various system level cache memories 220 in the 2D mesh network 300 in a relatively uniform fashion. As a result, each system level cache memories 220 receives approximately the same number of memory operations from a given active core 210.

A second portion of the cores are inactive cores 210 with repurposed level 2 cache memories 212. In some examples, inactive cores 210 that include a repurposed level 2 cache memory 212 are distributed randomly in the 2D mesh network 300. As a result, some regions of the 2D mesh network 300 can have a relatively high concentration of repurposed level 2 cache memories 212, while other regions of the 2D mesh network 300 can have a moderate concentration or relatively low concentration of repurposed level 2 cache memories 212. In some examples, inactive cores 210 that include a repurposed level 2 cache memory 212 are distributed more or less evenly in the 2D mesh network 300. More specifically, inactive cores 210 that include a repurposed level 2 cache memory 212 can be distributed in a checkboard pattern, or in some other defined pattern. The percentage of cores 210 in the 2D mesh network 300 that have repurposed level 2 cache memories 212 can vary. For example, the inactive cores 210 with repurposed level 2 cache memories 212 as a percentage of total cores 210 can be 25%, 50%, 75%, and/or the like. In some examples, latency for accessing data stored in a repurposed level 2 cache memory 212 can be reduced by distributing inactive cores 210 that include a repurposed level 2 cache memory 212 evenly throughout the 2D mesh network 300.

System level cache memories 220 are distributed throughout the 2D mesh network 300. When an active core 210 issues a memory operation, and there is a cache miss in the level 2 cache memory 212 of that active core 210, one of the system level cache memories 220 (and the associated system level cache controller 230) in the 2D mesh network 300 can service the memory operation. As a result, the system level cache controller 230 that services the memory operation could be close to the requesting active core 210 or could be far away from the requesting active core 210. The system level cache controller 230 retrieves the data from the system level cache memory 220 or from one of the repurposed level 2 cache memories 212, depending on where the data resides. If the data is not stored in either the system level cache memory 220 or in one of the repurposed level 2 cache memories 212, then the system level cache controller 230 determines that the request for the data results in a cache miss. The system level cache controller 230 retrieves the data from system memory 104. The system level cache controller 230 allocates a cache line in the system level cache memory 220 and/or in one of the system level cache memories 220 accessible by the system level cache controller 230. In some examples, the system level cache controller 230 evicts a cache line in the system level cache memory 220 and/or in one of the system level cache memories 220 to make room for the new data.

The system level cache controller 230 preferentially stores the data in a cache line of a repurposed level 2 cache memory 212 in an inactive core 210 that is on the path between the requesting active core 210 and the system level cache memory 220 that services the memory operation. This inactive core 210 can be closer to the system level cache memory 220, closer to the requesting active core 210, or at a midpoint between the system level cache memory 220 and the requesting active core 210. If no repurposed level 2 cache memory 212 is on the path between the requesting active core 210 and the system level cache memory 220, then the system level cache controller 230 selects a repurposed level 2 cache memory 212 in an inactive core 210 that is not on the path between the requesting active core 210 and the system level cache memory 220. When the requesting active core 210, or other active core 210, subsequently requests data in that cache line, the system level cache controller 230 accesses and updates the repurposed level 2 cache memory 212 as needed. The requesting active core 210 and/or other active cores 210 access the data in the repurposed level 2 cache memory 212.

The path between the requesting active core 210 and the system level cache memory 220 includes three path components: (1) the distance between the requesting active core 210 and the system level cache memory 220; (2) the distance between the system level cache memory 220 and the repurposed level 2 cache memory 212; and (3) the path of the data transmitted from the repurposed level 2 cache memory 212 to the requesting active core 210. The disclosed techniques preferentially select an overall path that is the shortest path among the available alternatives. However, any one or more of the three path components may not be the shortest possible for that path component. The second path component is the distance travelled by the access operation performed by the system level cache memory 220 towards the repurposed level 2 cache memory 212. The third path component is the distance travelled by the data from the repurposed level 2 cache memory 212 to the requesting active core 210. The length of the first path component varies because each active core 210 distributes memory operations more or less evenly among the system level cache memories 220 in the 2D mesh network 300. However, the system level cache controller 230 can select a repurposed level 2 cache memory 212 that trades off the length of the second path component relative to the third path component.

In that regard, the system level cache controller 230 can select a repurposed level 2 cache memory 212 that reduces the latency of the second path component, while the latency of the third path component may increase. As a result, the access operation can have a shorter path while the data can have a longer path. Correspondingly, the system level cache controller 230 can select a repurposed level 2 cache memory 212 that reduces the latency of the third path component, while the latency of the second path component may increase. As a result, the data can have a shorter path while the access operation can have a longer path.

One technique for measuring path distance is to measure the number of network hops from one position on the 2D mesh network 300 to another position on the 2D mesh network 300. As referred to herein, a network hop is the distance between one switch 310 and an adjacent switch 310. This path distance is considered a first order metric for the latency of a memory operation that travels on that path. Therefore, the fewer hops that exist for a particular path, the lower the latency for that path. The system level cache controller 230 preferentially selects a shortest path, as measured by the shortest number of network hops, between the memory operation issued by the requesting active core 210 and the data returning to the requesting active core 210.

In general, the system level cache controller 230 can select any repurposed level 2 cache memory 212 corresponding to any inactive core 210 to store data for a particular memory requestion operation. With the disclosed techniques, the system level cache controller 230 selects a repurposed level 2 cache memory 212 corresponding to an inactive core 210 that is on the shortest path between the system level cache memory 220 and the requesting active core 210. Therefore, the system level cache controller 230 performs an access operation in a direction towards the requesting active core 210. This technique assumes that the active core 210 that requested the data in the first instance is the active core 210 that is likely to request the same data in the future. The system level cache controller 230 selects a repurposed level 2 cache memory 212 that reduces latency for subsequent memory operations for the same data from the same requesting active core 210. The latency for a different requesting active core 210 that subsequently requests the same data can be higher or lower relative to the latency for the original requesting active core 210 for the data.

To direct the access operation in the preferred direction, the system level cache controller 230 for the system level cache memory 220 employs a presence vector that identifies the repurposed level 2 cache memory 212 that stores the data for the memory operation. In some examples, the presence vector is a bit vector that includes one bit for each active level 2 cache memory 212 and each repurposed level 2 cache memory 212. The presence vector indicates which one or more active level 2 cache memories 212 and/or repurposed level 2 cache memories 212 stores the data for a memory operation. The system level cache memory 220 can direct an access operation to only the repurposed level 2 cache memory 212 that stores the data for a memory operation, as identified by the presence vector. In some examples, data for a particular memory operation can be stored in any one or more active level 2 cache memories 212, but is stored in no more than one repurposed level 2 cache memory 212.

After data is stored in a cache line of a repurposed level 2 cache memory 212, and a requesting active core 210 requests the data via a memory operation, the data in the cache line can remain in the repurposed level 2 cache memory 212. Additionally or alternatively, the data in the cache line can be transferred to the active level 2 cache memory 212 in the requesting active core 210 and removed from the repurposed level 2 cache memory 212. If the data in the cache line is dirty, then this transfer occurs if the requesting active core 210 is a caching agent. A caching agent is capable of storing and managing cache data that is in a dirty state. Dirty data is cache data that has been modified after the data has been retrieved from system memory 104 but has not yet been written back to system memory. Therefore, dirty data in cache memory is different from the corresponding data in system memory 104. By contrast, clean cache data has not been modified since the data has been retrieved from system memory 104. Additionally or alternatively, clean cache data is data that has been modified since the data has been retrieved from system memory 104, but has since been written back to system memory 104. Therefore, clean data in cache memory is the same as the corresponding data in system memory 104. If the requesting active core 210 is not a caching agent, then the requesting active core 210 is only capable of storing and managing cache data that is in a clean state. If a requesting active core 210 that is not a caching agent requests the data, then the data remains in the repurposed level 2 cache memory 212 and is not transferred to the requesting active core 210.

The system level cache controller 230 defines a candidate vector that indicates the location of the requesting active core 210 relative to the system level cache memory 220. The candidate vector is based on a direction state that is stored per cache line and that indicates the location of the requesting active core 210 by specifying the direction from the system level cache memory 220 to the requesting active core 210 in various embodiments. In some examples, the direction state is a two-bit value per cache line that identifies the direction of the requesting active core 210 that requested the data in cache line relative to the system level cache memory 220 and the corresponding system level cache controller 230 that serviced the memory operation. The two-bit direction state identifies whether the requesting active core 210 is above, below, left, or right of the system level cache memory 220 associated with the system level cache controller 230.

The system level cache controller 230 stores the direction state in an SLC cache tag database within a memory of the system level cache controller 230. Additionally or alternatively, the system level cache controller 230 stores the direction state along with the cache line in the repurposed level 2 cache memory 212. The system level cache controller 230 uses the direction state to generate a candidate vector to allocate a repurposed level 2 cache memory 212 that is on the path to the requesting active core 210.

Figure 4A:
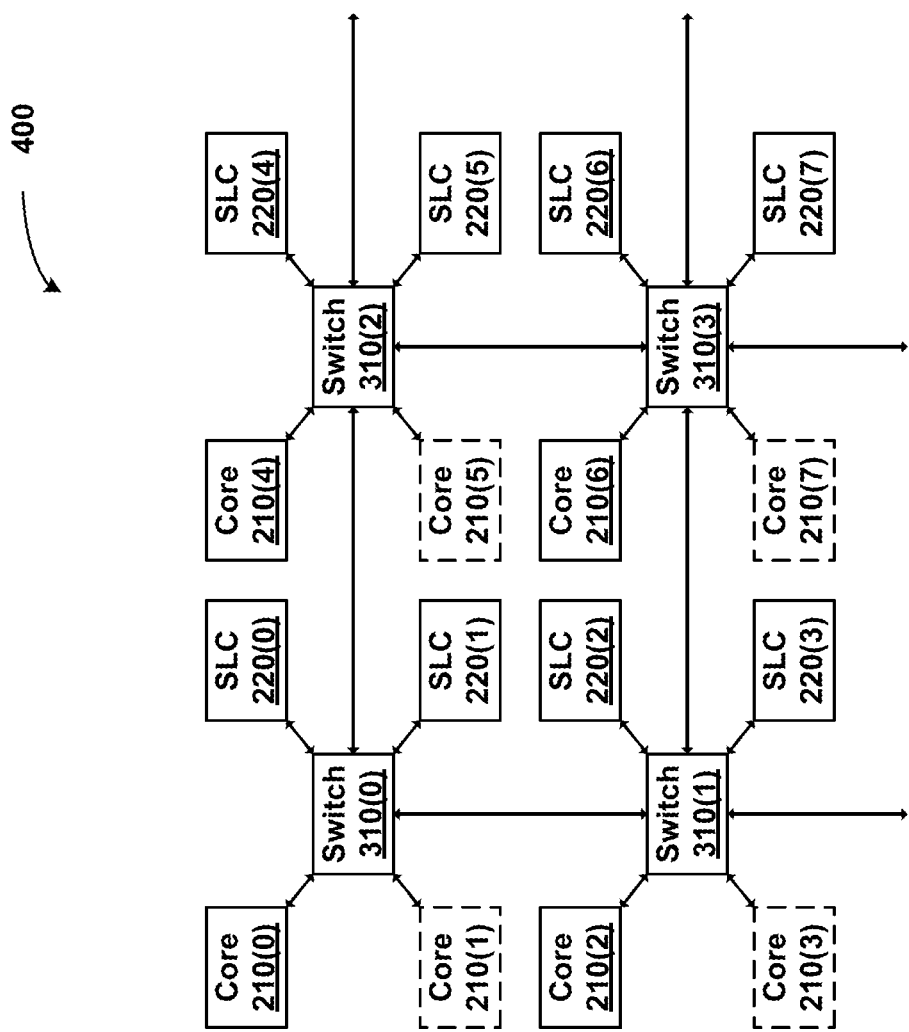
FIGS. 4A-4B illustrate a portion of the network of FIG. 3, according to various embodiments.
Figure 4B:
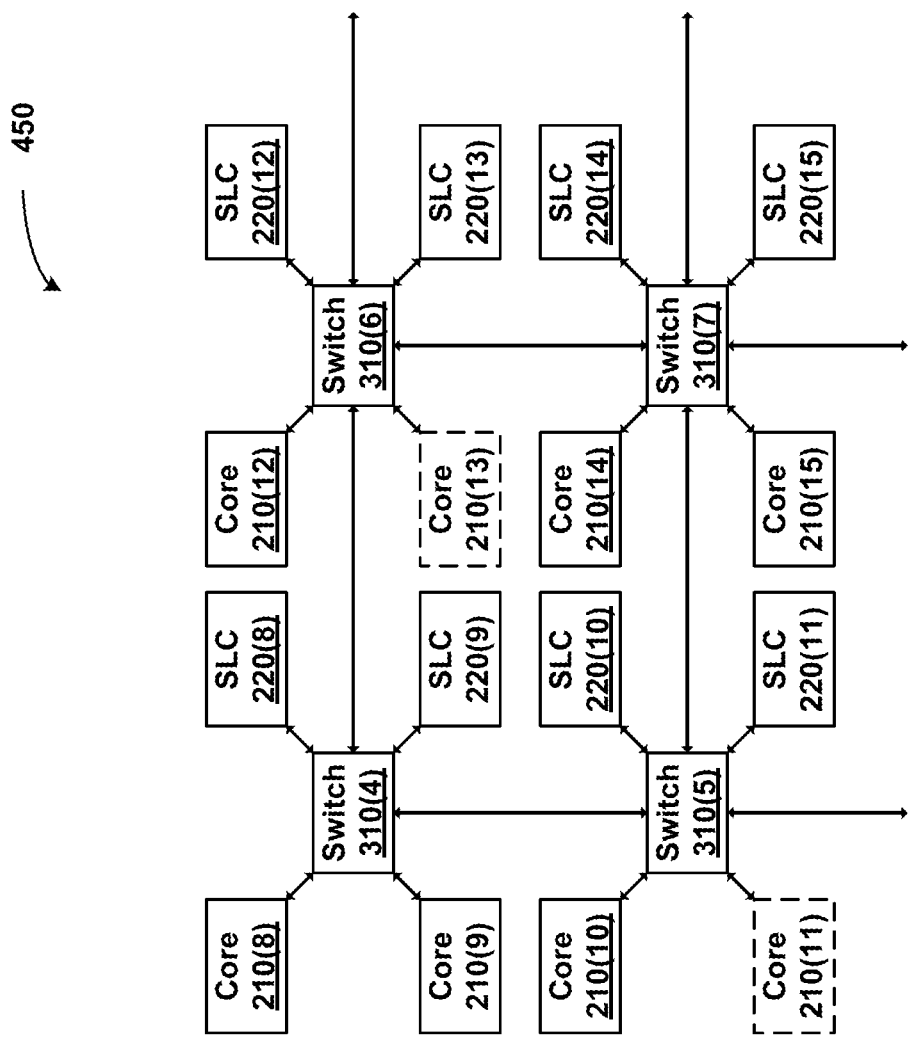

FIGS. 4A-4B illustrate a portion of the network 300 of FIG. 3, according to various embodiments. As shown in FIG. 4A, the portion 400 of the network 300 includes, without limitation, cores 210(0)-210(7) and system level cache memories (SLCs) 220(0)-220(7) that communicate with one another via switches 310(0)-310(3). The ratio of inactive cores to all cores is 50%, distributed in a checkerboard pattern. Active cores 210(0), 210(2), 210(4), and 210(6) generate memory operations. If a memory operation misses on the local L1 cache memory and the local L2 cache memory, then active core 210(0), 210(2), 210(4), or 210(6) transmits the memory operation to one of the system level cache memories 220(0)-220(7) and corresponding system level cache controller 230 (not shown). If the system level cache controller 230 determines that the requested data is not in the relevant system level cache memory 220(0)-220(7), then the system level cache controller 230 selects a repurposed level 2 cache memory 212 (not shown) associated with one of the inactive cores the 210(1), 210(3), 210(5), and 210(7). The system level cache controller 230 selects the repurposed level 2 cache memory 212 based on a candidate vector that identifies the direction of the relevant inactive cores the 210(1), 210(3), 210(5), and 210(7) relative to the relevant system level cache memory 220(0)-220(7).

As shown in FIG. 4B, the portion 450 of the network 300 includes, without limitation, cores 210(8)-210(15) and system level cache memories (SLCs) 220(8)-220(15) that communicate with one another via switches 310(4)-310(7). The ratio of inactive cores to all cores is 25% distributed evenly throughout the network 300. Active cores 210(8), 210(9), 210(10), 210(12), 210(14), and 210(15) generate memory operations. If a memory operation misses on the local L1 cache memory and the local L2 cache memory, then active core 210(8), 210(9), 210(10), 210(12), 210(14), or 210(15) transmits the memory operation to one of the system level cache memories 220(8)-220(15) and corresponding system level cache controller 230 (not shown). If the system level cache controller 230 determines that the requested data is not in the relevant system level cache memory 220(8)-220(15), then the system level cache controller 230 selects a repurposed level 2 cache memory 212 (not shown) associated with one of the inactive cores 210(11) and 210(13). The system level cache controller 230 selects the repurposed level 2 cache memory 212 based on a candidate vector that identifies the direction of the relevant inactive cores 210(11) and 210(13) relative to the relevant system level cache memory 220(8)-220(15).

The system level cache controller 230 selects a repurposed level 2 cache memory 212 that is on the shortest available path between the requesting active core 210 and the system level cache memory 220 for the system level cache controller 230. In so doing, the system level cache controller 230 defines certain data structures to map which repurposed level 2 cache memories 212 are available for a given system level cache memory 220 attached to a given switch 310. As described herein, the 2D mesh network 300 includes an array of C columns of switches 310 arranged in R rows. Each switch 310 is designated with a row number and a column number to identify the position of the switch 310 in the 2D mesh network 300. The switch 310 at 0, 0 is located at the lower left of the 2D mesh network. The switch 310 at R-1, C-1 is located at the upper right of the 2D mesh network.

The system level cache controller 230 defines a 2D array structure RL2_FREE[x][y], where x is a column number and y is a row number of a switch 310 in the 2D mesh network. RL2_FREE[x][y] is a binary value that identifies which repurposed level 2 (RL2) cache memories 212 are available (free) for a given system level cache memory 220 attached to a given switch 310 switch [x][y] at column x and row y. The entries in the RL2_FREE[x][y] array can be different from one another. Further, the entries in the RL2_FREE[x][y] array can change over time. For example, if a core 210 transitions from active to inactive, the active level 2 cache memory 212 for that core 210 becomes available as a repurposed level 2 cache memory 212. Similarly, if a core 210 transitions from inactive to active, the repurposed level 2 cache memory 212 for that core 210 is no longer available and instead becomes an active level 2 cache memory 212 for the newly active core 210. In some examples, the total possible number of repurposed level 2 cache memories 212 available at a given switch 310 is two. In such examples, the binary value for each entry in the RL2_FREE[x][y] array is defined according to Table 1 below:

TABLE 1

Free Array Value Definitions

00 - No repurposed level 2 cache memories 212 is connected to the switch 310 switch[x][y]
01 - repurposed level 2 cache memories 212 is available in the upper core 210 of the switch 310 switch[x][y]
10 - repurposed level 2 cache memories 212 is available in the lower core 210 of the switch 310 switch[x][y]
11 - repurposed level 2 cache memories 212 is available in both the lower core 210 and the upper core 210 of the switch 310 switch[x][y]

An active core 210 attached to the switch 310 switch [i][j] can perform a write back to a system level cache memory 220 attached to the switch 310 switch [x][y]. When this occurs, the memory controller associated with the system level cache memory 220 determines a best direction. This best direction is for the cache line being written from the active core 210 to the system level cache memory 220. The memory controller selects the best direction according to Table 2 below:

TABLE 2

Active Core Writeback to System Level Cache Memory 100  case j>y : Best_Direction = Up
102  case j<y : Best_Direction = Down
104  case j=y: {case i>x : Best_Direction = Right
106     case i=<x : Best_Direction = Left}

As shown in line 100, the memory controller determines if the row number of the active core 210 is greater than the row number of the system level cache memory 220. If so, then the active core 210 higher than the system level cache memory 220, and the memory controller sets the best direction as up.

As shown in line 102, the memory controller determines if the row number of the active core 210 is less than the row number of the system level cache memory 220. If so, then the active core 210 lower than the system level cache memory 220, and the memory controller sets the best direction as down.

If the memory controller reaches line 104, then the active core 210 and the system level cache memory 220 are on the same row. The memory controller determines if the column number of the active core 210 is greater than the row number of the system level cache memory 220. If so, then the active core 210 is to the right of the system level cache memory 220, and the memory controller sets the best direction as right.

As shown in line 106, the memory controller determines if the column number of the active core 210 is less than or equal to the row number of the system level cache memory 220. If so, then the active core 210 is to the left of, or at the same switch 310 as, the system level cache memory 220, and the memory controller sets the best direction as left.

After determining the best direction, the memory controller determines whether the cache line being written by the active core 210 hits on the system level cache memory 220. If so, then the memory controller overwrites the data in the corresponding cache line in the system level cache memory 220 with the data received from the active core 210. Further, the memory controller updates the existing best direction stored in the SLC cache tag for the cache line to reflect the new best direction determined above. Otherwise, if the cache line being written by the active core 210 misses on the system level cache memory 220, then the memory controller can allocate a new cache line in the system level cache memory 220. The memory controller stores the data in the newly allocated cache line. Additionally or alternatively, the memory controller can allocate a new cache line in an available repurposed level 2 cache memory 212. The memory controller stores the data in the newly allocated cache line in the available repurposed level 2 cache memory 212.

A repurposed level 2 cache memory 212 attached to the switch 310 switch [i][j] can perform a write back to a system level cache memory 220 attached to the switch 310 switch [x][y]. When this occurs, the memory controller determines whether the cache line being written by the active core 210 hits on the system level cache memory 220. If so, then the memory controller does nothing, because the system level cache memory 220 already has a copy of the data received from the repurposed level 2 cache memory 212. Otherwise, if the cache line being written by the repurposed level 2 cache memory 212 misses on the system level cache memory 220, then the memory controller writes the cache line back to system memory 104.

A cache line stored in a system level cache memory 220 can be evicted from the system level cache memory 220 to an available repurposed level 2 cache memory 212. In such cases, the memory controller retrieves the best direction value stored in the SLC cache tag for the cache line. The best direction value aids the memory controller in selecting a repurposed level 2 cache memory 212 that is on the path toward the active core 210 that originally requested the data stored in the cache line. The memory controller selects the repurposed level 2 cache memory 212 by determining a near candidate vector, or, more simply, a candidate vector, based on this best direction value. The memory controller determines the near candidate vector according to Table 3 below:

TABLE 3

Eviction from System Level Cache Memory to Repurposed Level 2 Cache Memory

```
200 Case Best_Direction == Up:
202   Near_Candidate_vector = {RL2_FREE[x][y], RL2_FREE[x]
      [y+1]}
204 Case Best_Direction == Down:
206   Near_Candidate_vector = {RL2_FREE[x][y+1], RL2_FREE[x]
      [y]}
208 Case Best_Direction == Right:
210   Near_Canditiate_vector = {RL2_FREE[x][y], RL2_FREE[x+1]
      [y]}
212 Case Best_Direction == Left:
214   Near_Candidate_vector = {RL2_FREE[x+1][y], RL2_FREE[x]
      [y]}
216 Near_RL2 = RoundRobin(Near_Candidate_vector)
218 If Near_RL2 != Null
220   Stash Evicted cache line from SLC[x][y] to Near_RL2
222 Else
224   Far_RL2 = RoundRobin(RL2_FREE[0][0], RL2_FREE[1][0],
      RL2_FREE[2][0],..,RL2_FREE[max_x][max_y])
226   Stash Evicted cache line from SLC[x][y] to Far_RL2
```

Note that for explanatory and simplification purposes, Table 3 does not account for cases at the edges of the 2D mesh network 300, such as when x=0, y=0, x=C-1, and/or y=R-1.

As shown in line 200, for the case that the best direction is up, the memory controller performs line 202. The memory controller generates a near candidate vector based on the free value for the switch 310 switch [x][y] attached to the system level cache memory 220 to the free value for the switch 310 switch [x][y+1] immediately above.

As shown in line 204, for the case that the best direction is down, the memory controller performs line 206. The memory controller generates a near candidate vector based on the free value for the switch 310 switch [x][y+1] immediately above to the switch 310 switch [x][y] attached to the system level cache memory 220.

As shown in line 208, for the case that the best direction is right, the memory controller performs line 210. The memory controller generates a near candidate vector based on the free value for the switch 310 switch [x][y] attached to the system level cache memory 220 to the free value for the switch 310 switch [x+1][y] immediately to the right.

As shown in line 212, for the case that the best direction is left, the memory controller performs line 214. The memory controller generates a near candidate vector based on the free value for the switch 310 switch [x+1][y] immediately to the right to the switch 310 switch [x][y] attached to the system level cache memory 220.

As shown in line 216, the memory controller determines a near value representing a near repurposed level 2 cache memory 212 based on the near candidate vector in the best direction. As shown, the memory controller generates the near value using a round robin function, although other functions could be used within the scope of the disclosure. As shown at lines 218 and 220, if this near value representing a near repurposed level 2 cache memory 212 is not equal to null, then the memory controller found a repurposed level 2 cache memory 212 on the path from the system level cache memory 220 to the originally requesting active core 210. The memory controller stores the cache line evicted from the system level cache memory 220 in this near repurposed level 2 cache memory 212.

Otherwise, as shown at lines 222 and 224, if this near value representing a near repurposed level 2 cache memory 212 is equal to null, then the memory controller did not find a repurposed level 2 cache memory 212 on the path from the system level cache memory 220 to the originally requesting active core 210. The memory controller determines a far value representing a far repurposed level 2 cache memory 212 that is selected from among all of the available repurposed level 2 cache memories 212. As shown at line 226, the memory controller stores the cache line evicted from the system level cache memory 220 in this far repurposed level 2 cache memory 212. As a result, if Table 3 does not yield a repurposed level 2 cache memory 212 that is on the path toward the active core 210 that originally requested the data stored in the cache line, then the memory controller selects any available repurposed level 2 cache memory 212 that is not on the path. Even though this can result in a less than optimal selection of a repurposed level 2 cache memory 212, the performance of a non-optimal repurposed level 2 cache memory 212 can still be better than the performance of fetching the data from system memory 104.

It will be appreciated that the system shown herein is illustrative and that variations and modifications are possible. The techniques described herein define a two-bit direction state per cache line that identifies the direction of the requesting active core 210 that requested the data in cache line relative to the system level cache memory 220 and the corresponding system level cache controller 230 that serviced the memory operation. The two-bit direction state identifies whether the requesting active core 210 is above, below, left, or right of the system level cache memory 220 associated with the system level cache controller 230. Additionally or alternatively, the techniques can define a three-bit direction state per cache line. In addition to the four directions of the two-bit direction state, the three-bit direction state identifies whether the requesting active core 210 is above left, above right, below left, or below right of the system level cache memory 220 associated with the system level cache controller 230. Additionally or alternatively, the techniques can define a multi-bit direction state per cache line that identifies a group of active cores 210 of the network that includes the requesting active core 210. The number of active cores 210 in each group can be four active cores 210, eight active cores 210, sixteen active cores 210, and/or the like. Each of the groups of processing units has a different identifier that is stored in the direction state. Additionally or alternatively, the techniques can define a multi-bit direction state per cache line that is a unique identifier of the requesting active core 210. Each of the processing units has a different identifier that is stored in the direction state. Additionally or alternatively, the techniques can define a multi-bit direction state per cache line that identifies the number of network hops, or other distance measure, between the requesting active core 210 and the system level cache memory 220 associated with the system level cache controller 230.

The techniques described herein are in the context of a core that includes one or more CPUs 102 and/or one or more accelerator processing subsystem 112. Additionally or alternatively, the techniques described herein can be performed by one or more processing units including, without limitation, CPUs, GPUs, DMA units, IPUs, NPUs, TPUs, NNPs, DPUs, VPUs, ASICs, FPGAs, and/or the like, in any combination. Further, the techniques described herein can be directed towards any one or more processing units including, without limitation, CPUs, GPUs, DMA units, IPUs, NPUs, TPUs, NNPs, DPUs, VPUs, ASICs, FPGAs, and/or the like, in any combination. More generally, the techniques described herein can be applied to any CPU 102, accelerator processing subsystem 112, and/or any other processing unit in any combination.

The techniques described herein are in the context of a network-on-chip 240 arranged with a 2D mesh topology. Additionally or alternatively, the techniques described herein can be performed with other network topologies, such as other mesh network topologies, crossbar network topologies, ring network topologies, torus network topologies, and/or the like. Further, the techniques described herein are in the context of a network-on-chip 240 where each switch 310 in the network-on-chip 240 includes two cores 210 and two system level cache memories 220. Additionally or alternatively, the techniques described herein can be performed with other switch configurations, including one core 210 per switch 310, one system level cache memory 220 per switch 310, more than two cores 210 per switch 310, and/or more than two system level cache memories 220 per switch 310, in any technically feasible combination.

As used herein, references to shared memory may include any one or more technically feasible memories, including, without limitation, a local memory shared by one or more cores 210, or a memory accessible via the memory interface, such as a cache memory, system memory 104, and/or memory included in an accelerator processing subsystem 112. Further, as used herein, references to cache memory may include any one or more technically feasible memories, including, without limitation, a level 1 cache, a level 2 cache, a repurposed level 2 cache, a system level cache, and/or the like. In view of the foregoing, persons of ordinary skill in the art will appreciate that the architecture described in the Figures in no way limits the scope of the various embodiments of the present disclosure.

Figure 5:
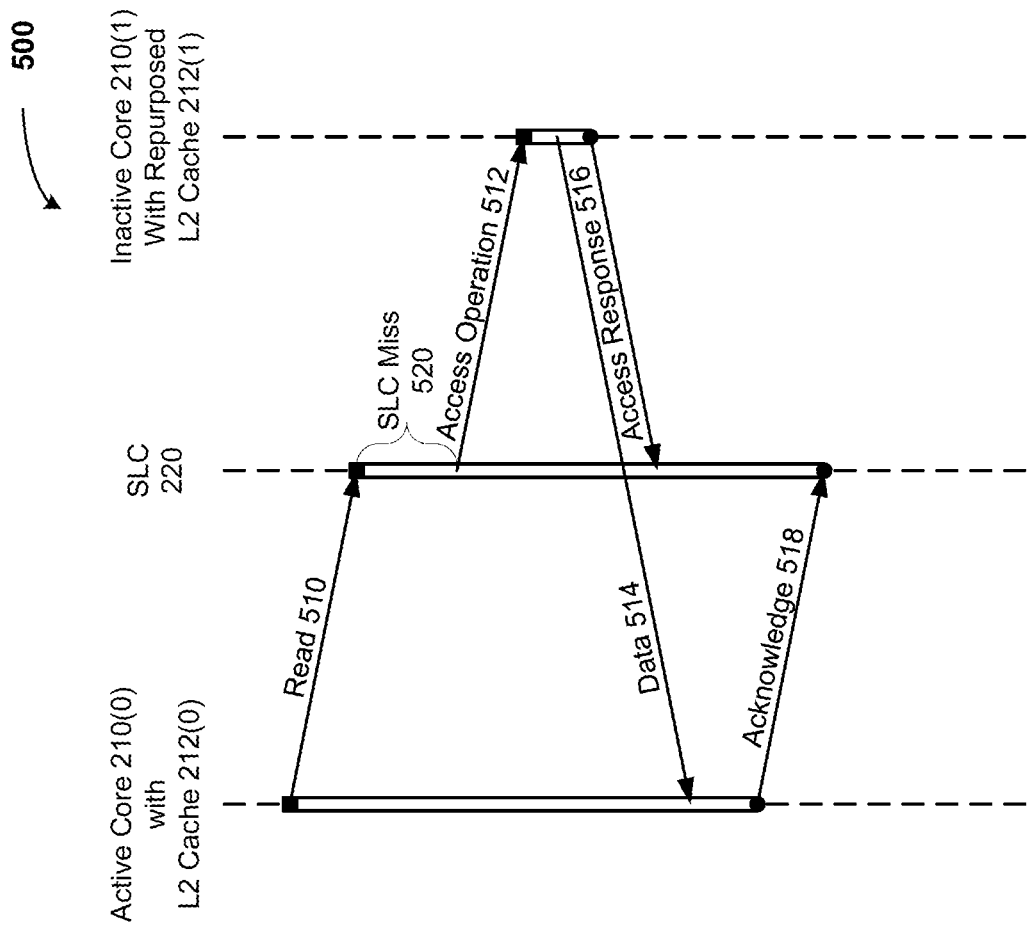
FIG. 5 is a sequence diagram of processing a memory read request using the system on chip of FIG. 2 and network of FIGS. 3-4B, according to various embodiments.

FIG. 5 is a sequence diagram of processing a memory read request using the system on chip of FIG. 2 and network of FIGS. 3-4B, according to various embodiments. As shown, an active core 210(0) with a local level 2 (L2) cache memory 212(0) generates a memory operation that misses in the local level 1 cache memory (not shown) and the local level 2 (L2) cache memory 212(0). As a result, active core 210(0) selects a system level cache memory (SLC) 220 in the network and transmits the memory operation as read operation 510 to the system level cache memory 220. The system level cache controller 230 associated with the system level cache memory 220 determines that the data is not in the system level cache memory 220, resulting in a cache miss 520. The system level cache controller 230 generates a candidate vector that identifies the direction of the active core 210(0) relative to the system level cache memory 220. The system level cache controller 230 selects an inactive core 210(1) with a repurposed level 2 cache memory 212(1) based on the candidate vector. The system level cache controller 230 preferentially selects an inactive core 210(1) with a repurposed level 2 cache memory 212(1) that is in a same direction as the active core 210(0). The system level cache controller 230 generates an access operation 512 and transmits the access operation 512 to the repurposed level 2 cache memory 212(1).

The repurposed level 2 cache memory 212(1) generates an access response 516 and transmits the access response 516 to the system level cache controller 230 associated with the system level cache memory 220. The access response 516 indicates that the repurposed level 2 cache memory 212(1) has the data 514 requested by the read operation 510. The repurposed level 2 cache memory 212(1) transmits the data 514 requested by the read operation 510 to the active core 210(0). The active core 210(0) stores the data 514 in a local memory, such as the level 2 cache memory 212(0). The active core 210(0) generates an acknowledgement 518 and transmits the acknowledgement 518 to the system level cache controller 230 associated with the system level cache memory 220.

Figure 6:
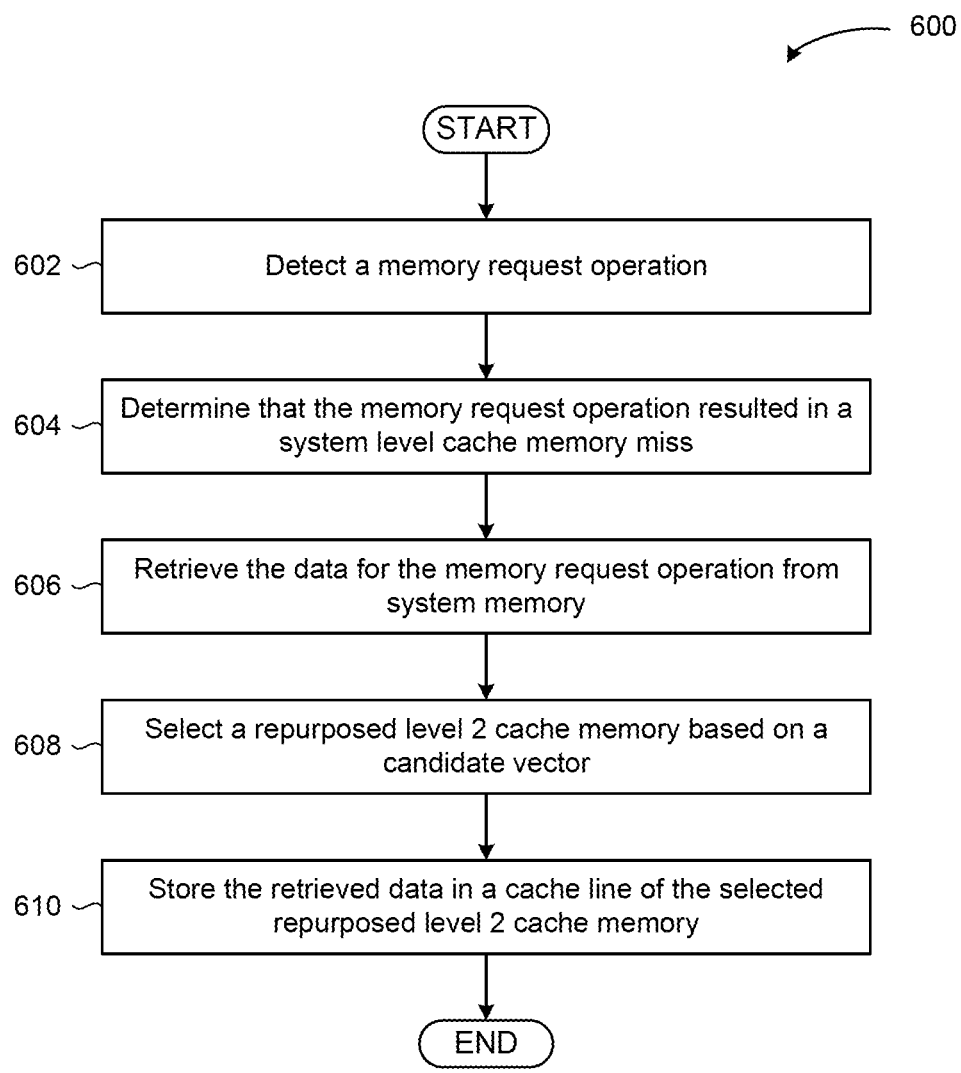
FIG. 6 illustrates a flow diagram of method steps for storing data in a repurposed cache memory in a computing system, according to various embodiments.

FIG. 6 illustrates a flow diagram of method steps for storing data in a repurposed cache memory in a computing system, according to various embodiments. The method steps can be performed by CPU 102, accelerator processing subsystem 112, and/or the like. Additionally or alternatively, the method steps can be performed by one or more processing units and/or alternative accelerators including, without limitation, CPUs, GPUs, DMA units, IPUs, NPUs, TPUs, NNPs, DPUs, VPUs, ASICS, FPGAs, and/or the like, in any combination. Although the method steps are described in conjunction with the systems of FIGS. 1-5, persons of ordinary skill in the art will understand that any system configured to perform the method steps, in any order, is within the scope of the present disclosure.

As shown, a method 600 begins at step 602, where a controller, such as system level cache controller 230 of FIG. 2, detects a memory operation. When a processing unit in an active core 210 requests data from memory, to read data from memory and/or to write data to memory, a local memory controller in the active core 210 first seeks the data from a local level 1 cache memory. If the data is not stored in the level 1 cache memory, then the local memory controller next seeks the data from the level 2 cache memory. If the data is not stored in the level 2 cache memory, then the local memory controller next transmits the memory operation to a controller, such as the system level cache controller 230 associated with a system level cache memory 220. The controller thereby detects that a memory operation has been received.

At step 604, the controller determines that the memory operation resulted in a system level cache memory miss. If the data is not stored in the system level cache memory 220, then the controller can determine whether the data is stored in a repurposed level 2 cache memory 212. If the data is not stored in a repurposed level 2 cache memory 212, then the controller determines that the data is stored in system memory 104.

At step 606, the controller retrieves the data for the memory operation from system memory 104. If the data for the memory operation is not located in any cache memory, then the data for the memory operation is stored in system memory 104.

At step 608, the controller selects a repurposed level 2 cache memory 212 based on a candidate vector generated from direction state that is stored per cache line. To select a repurposed level 2 cache memory 212, the controller generates a candidate vector from the direction state based on the position in the network of the active core 210 that includes the requesting processing unit relative to the position in the network of the system level cache memory 220 associated with the controller. In some examples, the direction state is a two-bit direction state that identifies whether the requesting active core 210 is above, below, left, or right of the system level cache memory 220 associated with the controller. Additionally or alternatively, the direction state is a three-bit direction state where, in addition to the four directions of the two-bit direction state, the three-bit direction state further identifies whether the requesting active core 210 is above left, above right, below left, or below right of the system level cache memory 220 associated with the controller. Additionally or alternatively, the direction state is a multi-bit direction state that identifies a region of the network that includes the requesting active core 210. The number of active cores 210 in each region can be four active cores 210, eight active cores 210, sixteen active cores 210, and/or the like. Additionally or alternatively, the direction state is a multi-bit direction state that uniquely identifies the requesting active core 210. Additionally or alternatively, the direction state is a multi-bit direction state that identifies the number of network hops, or other distance measure, between the requesting active core 210 and the system level cache memory 220 associated with the controller.

At step 610, the controller stores the retrieved data in a cache line of the repurposed level 2 cache memory 212. In addition, the controller stores the direction state to aid the controller when the same data is subsequently requested by the original requesting processing unit and/or by any other processing unit in the same active core 210 or in a different active core 210. The controller stores the direction state as an SLC cache tag in a database within a memory included in the controller. Additionally or alternatively, the controller stores the direction state along with the data in a cache line of the repurposed level 2 cache memory 212.

The method 600 then terminates. Alternatively, the method 600 proceeds to step 602, described above, to process additional memory operations.

In sum, various embodiments include techniques for storing data in a repurposed cache memory in a computing system. The disclosed techniques provide for reduced latency for memory access operations directed to data stored in a repurposed level 2 cache memory. Processing units and repurposed level 2 cache memories are distributed in a network topology, such as a two-dimensional (2D) mesh topology. When a system level cache controller stores data in a cache line of a repurposed level 2 cache line, the system level cache controller also stores state data for each cache line, where the state data indicates a direction toward the processing unit that originally requested data included in the cache line. The state data can be a two-bit state that indicates whether the requesting processing unit is above, below, left, or right of the system level cache memory associated with the system level cache controller. Alternatively, the state data can be a three-bit state to indicate one of eight directions toward the requesting processing unit. Alternatively, the state data can be a multibit state that indicates a group of processing units, such as four, eight, or sixteen processing units, that includes the requesting processing unit. Alternatively, the state data can be a multibit state that identifies the particular requesting processing unit. This state data aids the system level cache controller when subsequently allocating a repurposed level 2 cache memory that is on a path between the system level cache memory and the original requesting processing unit.

At least one technical advantage of the disclosed techniques relative to the prior art is that, when possible, data is stored in repurposed level 2 cache memories so as to be readily retrievable by both the system level cache controller and by the requesting processing unit. As a result, a processing unit that requests data stored in a repurposed level 2 cache memory realizes lower data access times relative to prior conventional approaches. These lower data access times can lead to higher computational performance and reduced power consumption. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for storing data in a repurposed cache memory in a computing system, the method comprising:
    determining that a memory operation from a first processing unit results in a miss in a system level cache memory;
    retrieving data associated with the memory operation from a system memory;
    generating a candidate vector that specifies a direction from the system level cache memory to the first processing unit;
    selecting a repurposed level two cache memory based on the candidate vector; and
    storing the data in a cache line of the repurposed level two cache memory.

2. The computer-implemented method of claim 1, further comprising storing the direction in a cache tag of a system level cache controller.

3. The computer-implemented method of claim 1, wherein the first processing unit, the system level cache memory, and the repurposed level two cache memory are connected via a network-on-chip.

4. The computer-implemented method of claim 3, wherein the network-on-chip comprises a mesh network, a crossbar network, a ring network, or a torus network.

5. The computer-implemented method of claim 3, wherein the repurposed level two cache memory is located in the network-on-chip between the first processing unit and a system level cache controller associated with the system level cache memory.

6. The computer-implemented method of claim 3, wherein the direction comprises a two-bit state that identifies whether the first processing unit is above, below, left of, or right of the repurposed level two cache memory in the network-on-chip.

7. The computer-implemented method of claim 3, wherein the direction comprises a three-bit state that identifies one of eight directions from the repurposed level two cache memory to the first processing unit in the network-on-chip.

8. The computer-implemented method of claim 3, wherein the direction identifies a distance from the repurposed level two cache memory to the first processing unit in the network-on-chip.

9. The computer-implemented method of claim 1, wherein the direction identifies a group of processing units that includes the first processing unit.

10. The computer-implemented method of claim 1, wherein the direction comprises a unique identifier of the first processing unit.

11. The computer-implemented method of claim 1, wherein the repurposed level two cache memory is associated with a second processing unit that is in a low-power state.

12. The computer-implemented method of claim 1, wherein the repurposed level two cache memory is associated with a second processing unit that is inoperable.

13. The computer-implemented method of claim 1, wherein the repurposed level two cache memory is a stand-alone memory.

14. The computer-implemented method of claim 1, further comprising:
   determining that data in the cache line of the repurposed level two cache memory is to be evicted; and
   transmitting the data from the repurposed level two cache memory directly to the system memory.

15. A system, comprising:
   a system level cache memory;
   a first processor that includes a first local cache memory and that is coupled to the system level cache memory;
   a second processor that includes a second local cache memory and that is coupled to the first processor and the system level cache memory; and
   a system level cache controller that:
      determines that a memory operation from a first processing unit results in a miss in a system level cache memory;
      retrieves data associated with the memory operation from a system memory;
      generates a candidate vector that specifies a direction from the system level cache memory to the first processing unit;
      selects a repurposed level two cache memory based on the candidate vector; and
      stores the data in a cache line of the repurposed level two cache memory.

16. The system of claim 15, wherein the system level cache controller further stores the direction in a cache tag of the system level cache controller.

17. The system of claim 15, wherein the first processing unit, the system level cache memory, and the repurposed level two cache memory are connected via a network-on-chip.

18. The system of claim 17, wherein the network-on-chip comprises a mesh network, a crossbar network, a ring network, or a torus network.

19. The system of claim 17, wherein the repurposed level two cache memory is located in the network-on-chip between the first processing unit and a system level cache controller associated with the system level cache memory.

20. The system of claim 17, wherein the direction comprises a two-bit state that identifies whether the first processing unit is above, below, left of, or right of the repurposed level two cache memory in the network-on-chip.

* * * * *